United States Patent [19]

Aldrich

[11] Patent Number: 4,533,097

[45] Date of Patent: Aug. 6, 1985

[54] MULTI-MOTOR ACTUATION SYSTEM FOR A POWER DRIVE UNIT

[75] Inventor: Allyn M. Aldrich, Rockford, Ill.

[73] Assignee: Sundstrand Corporation, Rockford, Ill.

[21] Appl. No.: 512,798

[22] Filed: Jul. 11, 1983

[51] Int. Cl.³ ............................................. B64C 13/42
[52] U.S. Cl. .................................. 244/78; 244/76 R; 91/509; 91/510
[58] Field of Search ................... 244/75 R, 76 R, 194, 244/195, 78, 226, 215; 91/509, 510; 74/661, 665 A, 674, 675

[56] References Cited

U.S. PATENT DOCUMENTS

| 3,338,138 | 8/1967 | Wood | 244/78 |
| 3,338,139 | 8/1967 | Wood | 244/78 |
| 3,426,650 | 2/1969 | Jenney | 244/78 |
| 3,505,929 | 4/1970 | Coppola | 91/510 |
| 3,877,346 | 4/1975 | Koopmann et al. | 91/509 |

FOREIGN PATENT DOCUMENTS 846962  9/1960  United Kingdom ................... 244/78

OTHER PUBLICATIONS

*Hydraulics & Pneumatics*, "Airbus Hydraulic Power Always Available", pp. 57–60, vol. 25, No. 12, Dec. 1972.

*Primary Examiner*—Trygve M. Blix
*Assistant Examiner*—Rodney Corl
*Attorney, Agent, or Firm*—Harold A. Williamson; Ted E. Killingsworth; James A. Wanner

[57] ABSTRACT

The invention is directed to a multi-motor actuation system for a power drive unit. The system includes three independently hydraulically controlled motors adapted to be drivingly coupled to a power drive unit output. Two of the said motors are normally active at all times and the third motor acts as a back-up motor to provide redundancy for the two normally active motors. A hydraulic failure detection mechanism is controllingly coupled to the three independently hydraulically controlled motors. The hydraulic failure detection mechanism is responsive to any failure of one of the normally active hydraulically controlled motors to thereby cause the third motor to be coupled to the power drive unit. The failure detection mechanism is additionally responsive to a failure of both normally active hydraulically controlled motors to cause the third motor to take over the functions of both of the normally active hydraulically controlled motors.

22 Claims, 1 Drawing Figure

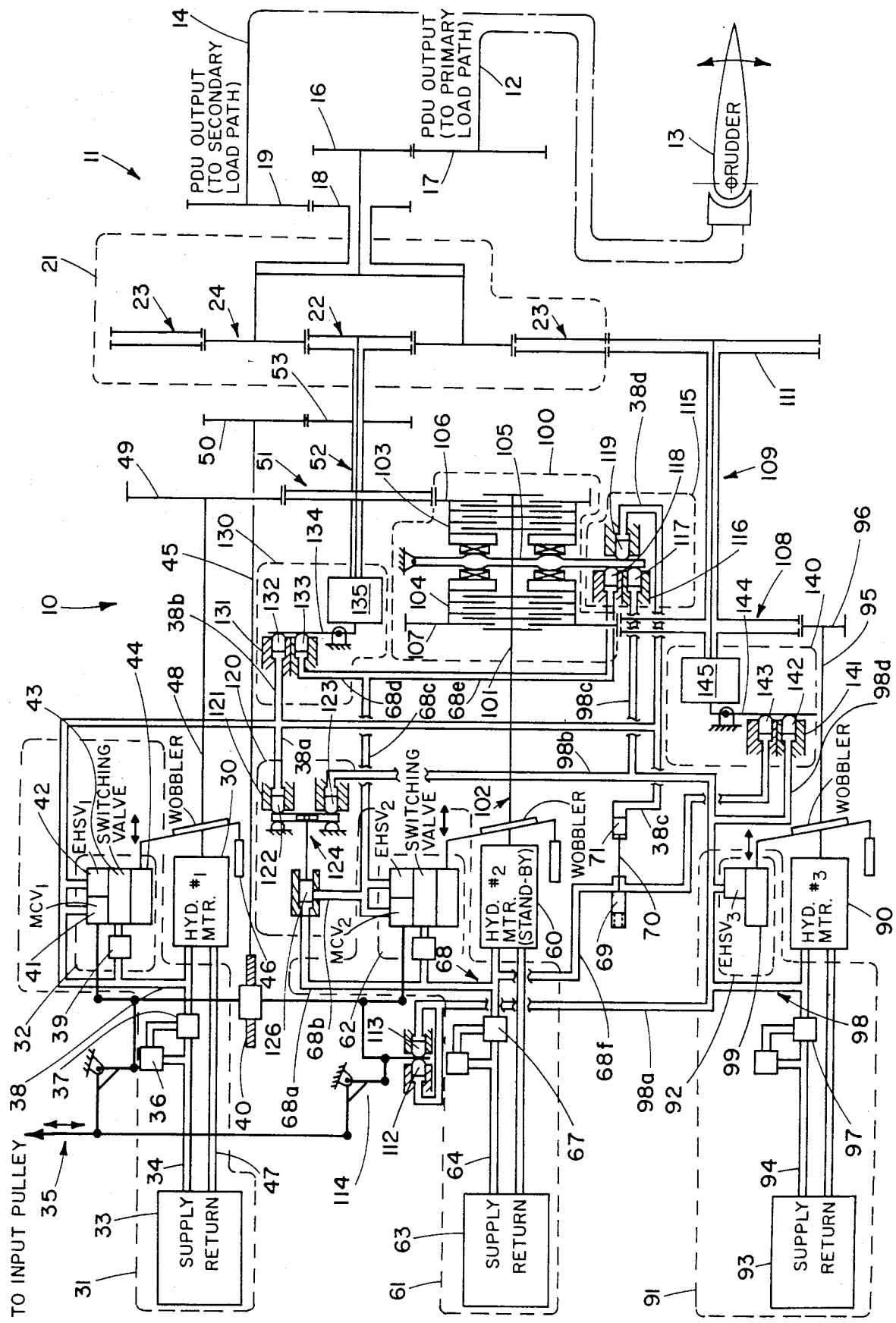

MULTI-MOTOR ACTUATION SYSTEM FOR A POWER DRIVE UNIT

TECHNICAL FIELD

This invention relates to a hydromechanical rudder and trim control actuation system.

BACKGROUND ART

In the state-of-the-art commercial transport aircraft, there are normally three independent active operating hydraulic systems. The aircraft's primary flight critical control surfaces normally simultaneously utilize all three of these hydraulic systems. The reasoning behind the simultaneous use of the three independent hydraulic systems is that hydraulic systems in aircraft experience a relative high failure rate. It is well recognized as basic to safe aircraft operation that flight critical control surfaces be powered even though one or more of the hydraulic systems have experienced a failure and have been lost.

Normally aircraft primary flight control systems have two distinct modes of operation, namely, one of gross motion such as the rudder mode on an aircraft, and the other of trim motion or damping motion such as the yaw damping mode of the rudder. In typical prior art linear hydraulic servo cylinder systems, a summing bar is utilized to receive a mechanical input to accomplish the positioning of a main power valve of a servo cylinder which results in a gross motion actuation mode. The opposite end of the summing bar is typically provided with an electro-hydraulic servo valve input which provides a damping input to the aforementioned main power valve.

In these types of prior art systems, parallel actuators or tandem actuators (see R. Westbury, U.S. Pat. No. 2,597,430) are utilized to provide for redundancy. As noted earlier, this requires that all independent hydraulic systems be active at all times except in the event of a hydraulic system failure. The prior art arrangements potentially result in higher forces than required being imposed upon the flight control surface since each of the parallel or tandem actuators have the capacity for operating the flight control surface alone.

Since all independent hydraulic systems are active at all times, excess hydraulic power is consumed resulting in a lower overall efficiency of the aircraft prime mover (engine) or the auxiliary power unit.

It is therefore a basic objective of the invention to be described hereinafter to replace the prior art servo cylinder systems heretofore described with a hydromechanical system that will provide the same kind or better redundancy and failure protection in the event of various types of mechanical, hydraulic and signal failures.

The desirability of redundancy of the type described aboard an aircraft has been recognized in the patented art by such inventors as D. Wood et al in their U.S. Pat. No. 3,368,351 directed to a "Redundant Control System"; G. D. Jenney in his U.S. Pat. No. 3,496,836 directed to a "Redundant Control System having Fail-Operate, Fail-Neutral and Channel Emergency Select", as well as Koopman et al in their U.S. Pat. No. 3,877,346 directed to an "Electro-hydraulic Actuation System with Redundancy Operation, Supervision and Emergency Operation". These inventions, however, do not provide the inventive approach to be described more fully hereinafter wherein a rudder and trim control actuation system uses these hydraulic motors each operating from its own independent hydraulic system where two motors are active at all times and the third is a standby motor that will provide redundancy for both of the other two motors. Nor do these referenced inventions provide for an arrangement that entertains and copes with the event of a hydraulic system failure by having the stand-by motor coupled into the failed system to back-up the failed motor. In addition, the invention to be described also provides a novel arrangement to cope with the event that both of the first two motors should fail. Should this failure occur, the standby motor can be utilized to operate both the gross motion and damping motion described earlier.

DISCLOSURE OF INVENTION

This invention relates to a hydromechanical system for a power drive unit (PDU) having an output shaft drivingly coupled to a load. The system includes a mechanical transmission which is drivingly connected to the output shaft and the load.

First, second and third independently hydraulically actuated motors are provided with the first and third motors drivingly coupled respectively to the mechanical transmission.

A double clutch is included which has an input shaft drivingly coupled to be driven by the second motor. The double clutch has first and second outputs respectively drivingly coupled to the mechanical transmission.

A clutch actuation unit is controllingly coupled to the double clutch to allow the clutch actuation unit to couple the input shaft to either the first or the second outputs. The clutch actuation unit has a normally neutral operative state whereby neither the first or second outputs are coupled to the input shaft.

A hydraulic failure detection mechanism is controllingly coupled to the second motor and to the clutch actuation unit.

The hydraulic failure detection mechanism is responsive to a hydraulic system failure in the first and third hydraulically actuated motors to thereby cause the clutch actuation unit to connect the second motor output through one of the double clutches first and second outputs, dependent upon which one of the first and third hydraulically actuated motors has failed whereby the load is always driven by at least two hydraulic motors via the mechanical transmission when one of the first or third hydraulically actuated motors experiences a failure.

It is therefore a primary object of the invention to provide a hydromechanical system for a power drive unit, which hydromechanical system employs three hydraulic motors each operating from its own independent hydraulic system where two of the motors are active at all times, and the third motor provides redundancy for both of the other two motors.

Another object of the invention is to provide a three motor hydromechanical system for a power drive unit (PDU) wherein each motor is provided with an independently controllable hydraulic system, and the hydromechanical system is responsive to hydraulic system failure such that one of the three motors and an associated independent hydraulic system functions as a back-up to the other two motors should one or both of the other motors experience a hydraulic system failure.

In the attainment of the foregoing objectives, the invention contemplates in its preferred embodiment a hydromechanical system for a power drive unit (PDU) having an output shaft drivingly coupled to an aircraft flight control surface, such as a rudder. The system includes a differential transmission having first and second members drivingly coupled through a third member to the PDU output shaft and the flight control surface. The differential transmission first member being a sun gear, the second member being a ring gear, while the third member is a planetary gear arrangement cooperatively interposed between the sun gear and the ring gear. First, second and third variable displacement hydraulic motors are each provided with, and are operated from an associated controllable independent hydraulic system. Each of the independent hydraulic systems include respectively a first hydraulic motor control device, a second hydraulic motor control device and third hydraulic motor control drvice. Each of the first, second and third hydraulic motor control devices are designed to be independently electrically remotely controllable.

The first and second hydraulic motor control devices have coupled thereto mechanical linkage apparatus which is additionally remotely controllable and is responsively dependent upon the operating condition of the independent hydraulic system associated with the third variable displacement hydraulic motor.

The first and third hydraulic motors have outputs which are drivingly coupled respectively to the differential transmission sun gear and ring gear.

A double clutch is provided which has an input shaft drivingly coupled to be driven by an output on the second hydraulic motor, the clutch having first and second outputs which are respectively drivingly coupled to the differential transmission, sun gear and ring gear.

A clutch actuation unit is controllingly coupled to the double clutch to allow said clutch actuation unit to couple said input shaft to either said first or said second outputs of the double clutch.

The clutch actuation unit is is a normally neutral operative state whereby neither the first or second outputs of the double clutch are coupled to the input shaft.

A major feature of the invention resides in the provision of a hydraulic failure detection mechanism which is controllingly coupled to the independent hydraulic system associated with the second hydraulic motor and to the clutch acutation unit.

The hydraulic failure detection mechanism is responsive to a hydraulic system failure in the first and third hydraulic motor independent hydraulic systems to thereby cause the clutch actuation unit to connect the second hydraulic motor output through one of the clutches first and second outputs, dependent upon which one of the first and third hydraulic systems has failed whereby the load is always driven by at least two hydraulic motors via the differential transmission when one of the hydraulic systems of either the first or third hydraulic motors experiences a failure.

An additionally significant facet of the invention resides in providing the hydromechanical system next above with a first and a second brake apparatus, which brakes are controllably releaseably connectable respectively to said differential transmission, sun gear and ring gear.

The first brake is responsively coupled to the independent hydraulic system associated with the first hydraulic motor.

The first brake is simultaneously operatively coupled to the independent hydraulic system associated with the second hydraulic motor and to said clutch actuation unit.

The second brake is responsively coupled separately to the independent hydraulic system associated with the third hydraulic motor and to the independent hydraulic system associated with the second hydraulic motor. The arrangement just described is so constructed that a hydraulic failure in the hydraulic systems associated with the first and third motors results in the simultaneous actuation of said second brake and the actuation of clutch actuation unit to thereby cause said double clutch first member to be coupled to the input shaft of said clutch which results in the second hydraulic motor driving the rudder via said differential transmission, sun gear and planetary gear arrangement.

Other objects and advantages of the present invention will be apparent upon reference to the accompanying description when taken in conjunction with the following single illustration.

BRIEF DESCRIPTION OF THE DRAWINGS

The sole drawing is a diagrammatic illustration of the hydromechanical system embodying the invention for use with a power drive unit.

DETAILED DESCRIPTION OF PREFERRED EMBODIMENT

Reference is now made to the sole illustration which depicts the preferred embodiment of the invention. This illustration will first be described with respect to the general layout and cooperation of the components shown and thereafter there will be provided a description of the system in various operational modes.

Accordingly, there is shown a hydromechanical system 10 for a power drive unit (PDU) 11 which has an output shaft 12 drivingly coupled as shown to an aircraft flight control surface, such as rudder 13. The power drive unit (PDU) 11 as illustrated shows a secondary output shaft 14 which is connected as shown to the rudder 13. The secondary output shaft 14 receives power via gears 18 and 19. The delivery of power to gear 18 will be described more fully hereinafter. For purposes of describing the invention hereinafter, it is only significant that there be a primary load path to the rudder 13 via the gears 16, 17 and shaft 12. This just described dual power path arrangement is explained in detail in the Embree U.S. Pat. No. 4,256,277, which patent shares a common assignee with this application.

The system includes a mechanical transmission in the form of a summing differential 21 shown in dotted outline. The differential transmission 21 includes first and second members drivingly coupled through a third member and gear train 16, 17 to power drive unit (PDU) output shaft 12, which output shaft 12 is coupled as noted earlier to the rudder 13. The differential transmission first member noted above takes the form of a sun gear arrangement 22, with the second member noted above being a ring gear arrangement 23, while the third member takes the form of planetary gear arrangement 24. The differential transmission 21 is a conventional summing arrangement with the planetary gear arrangement 24 cooperatively interposed between the sun gear arrangement 22 and the ring gear arrangement 23.

Shown to the left of center of the illustration are first, second and third variable displacement hydraulic motors 30, 60 and 90. The detailed operation and construction of this type of motor can be found in the Aldrich U.S. Pat. No. 4,210,066 or Aldrich patent application, Ser. No. 06/361,995 filed Mar. 25, 1982 and titled "Hydromechanical Power Unit". Each of the hydraulic motors 30, 60 and 90 are provided with, and are operated respectively from an associated controllable independent hydraulic system 31, 61 and 91. Each of the independent hydraulic systems 31, 61 and 91 include respectively a first hydraulic motor control device 32, a second hydraulic motor control device 62 and a third hydraulic motor control device 92. These hydraulic motor control devices have been shown in dotted outline. Each of the first, second and third motor control devices 32, 62 and 92 are designed to be independently electrically remotely controllable. The electrical connections are not shown as the exact manner of this remote control will not be described because the operation of this type of motor control is conventional. It is believed sufficient to point out at this time that the hydraulic motor control devices 32 and 62 are the same. The first hydraulic motor control device 32 includes a solenoid valve 39, a motor control valve 41 and an electro-hydraulic servo valve 42, switching valve 43 and a wobbler control piston 44. The controllable independent hydraulic system 31 includes a source of hydraulic fluid 33 under pressure connected by a supply conduit 34 through an isolation solenoid valve 36 and shut-off valve 37, as well as a branched conduit 38, which feeds fluid under pressure to the first hydraulic motor control device 32. The second hydraulic motor control device 62 is coupled in a similar manner to that described above from a source of hydraulic fluid 63 via supply conduit 64, shut-off valve 67 and branch conduit 68. The third hydraulic motor control device 92 is provided with an electro-hydraulic servo valve (EHSV$_3$) and a wobbler control piston 99. The third hydraulic motor control device 92 receives fluid under pressure from a source of hydraulic fluid 93 via supply conduit 94, shut-off valve 97 and branched conduit 98. The details of construction and specific operative characteristics of the variously recited motor control components above can be found in the Aldrich patent or patent application referenced above.

The first variable displacement hydraulic motor 30 receives fluid under pressure from branched conduit 38. The first hydraulic motor 30 is provided with a return conduit 47. The first variable displacement hydraulic motor 30 is shown having a wobbler mechanically coupled to the wobbler control piston 44 of the first hydraulic motor control device 32. A wobbler position transducer device 46 is shown diagramatically coupled to the wobbler to provide an electrical signal indicative of wobbler position. This electrical signal and its specific utility with respect to the operation of the system will not be described further, in that it does not form a part of the invention being described. It will be noted that each of the variable displacement hydraulic motors 30, 60 and 90 are provided with, as shown schematically, a wobbler position transducer. The first variable displacement hydraulic motor 30 has an output shaft 48 coupled via gears 49, 51 and concentric shaft 52 to the sun gear arrangement 22 of the differential transmission 21.

The second variable displacement hydraulic motor 60 has a motor output 102 connected directly to an input shaft 101 of a double clutch 100, which double clutch 100 will be described more fully hereinafter.

The third variable displacement hydraulic motor 90 has an output shaft 95 connected via gear 96, gear arrangement 108, concentric shaft arrangement 109 and gear arrangement 11 to the ring gear arrangement 23 of the differential transmission 21.

The double clutch 100 shown in dotted outline is provided with as heretofore noted, an input shaft 101 which is drivingly coupled to be driven by the output shaft 102 from the second variable displacement hydraulic motor 60. The double clutch 100 is provided with first and second outputs 103 and 104, which outputs are respectively drivingly coupled to the differential transmission, sun gear 22 via gear 106, gear arrangement 51 and concentric shaft arrangement 52. The second clutch output 104 is coupled to the ring gear 23 of the differential transmission 21 via gear 107, gear arrangement 108, concentric shaft arrangement 109 and gear arrangement 111. The double clutch 100 is provided with a clutch actuation lever 105 mounted for operation as shown in the illustration.

A clutch actuation unit 115 is controllably coupled via a clutch actuation lever 105 to the double clutch 100. This just described arrangement allows the clutch actuation unit 115 to couple the input shaft 101 of the double clutch 100 to either the first output 103 or the second output 104 of the double clutch 100. The dynamics of the operation of the clutch actuation unit 115 will be described more fully hereinafter. At this point in the description it is sufficient to note that the clutch actuation unit 115 is in a normally neutral operative state, as depicted in the illustration, whereby neither the first or second outputs 103 and 104 of the double clutch 100 are coupled to the input shaft 101.

A major feature of the invention as noted earlier resides in the provision of a hydraulic failure detection mechanism 120 shown in dotted outline. The hydraulic failure detection mechanism 120 is controllingly coupled to the independent hydraulic system 61 associated with the second variable displacement hydraulic motor 60 and to the clutch actuation unit 115 via conduits 38a and 98b, 98c.

The hydraulic failure detection mechanism 120 is responsive to a hydraulic system failure in the first and third hydraulic motor independent hydraulic systems 31 and 91, to thereby cause the clutch actuation unit 115 to connect the second hydraulic motor output shaft 102 through one of the double clutch 100 first and second outputs 103, 104, dependent upon which one of the first and third hydraulic systems 31, 91 has failed. In a manner to be described more fully hereinafter, it will be appreciated that this arrangement allows the rudder 13 to always be driven by at least two hydraulic motors via the differential transmission 21 when one of the hydraulic systems 31 or 91 of either the first or third hydraulic motors 30, 90 experiences a failure.

The clutch actuation unit 115 is comprised of a housing 116 with pistons 117, 118 and 119 positioned as shown in the illustration. The dynamic cooperation of the pistons 117, 118 and 119 in respect of the clutch actuation lever 105 of the double clutch 100 will become evident in the description of the systems operation that follows hereinafter.

The hydraulic failure detection mechanism 120 is shown including a housing 121 with pistons 122, 123 shown cooperating with a pivotal linkage 124, which is coupled to a piston 126 which controls the flow of hydraulic fluid between conduit branch 68a and 68b.

As was noted earlier, an additionally significant facet of the invention resides in providing the hydromechanical system 10 with first and second brake apparatus 130 and 140 shown herein dotted outline. The first brake apparatus 130 is shown to include a housing 131 with pistons 132, 133 cooperating with a brake release lever 134 of a first brake 135. The brake 135 is of the type which is hydraulically released and mechanically applied. The brake 135 is a conventional brake.

The second brake apparatus 140 includes a housing 141 with pistons 142, 143 cooperating with a brake release lever 144 of the second brake 145. The second brake 145 is identical to the first brake 135 as described above. The first brake 135 is controllably releaseably connected to the sun gear arrangement 22 of the differential transmission 21 via the concentric shaft arrangement 52.

The second brake 145 is controllable releasably connected to the ring gear arrangement 23 via the concentric shaft arrangement 109, and gear arrangement 111. The dynamics of the operation of the first and second brake apparatus 130, 140 will be described more fully hereinafter. At this point in the description it should be noted that the first brake apparatus 130 is responsively coupled to the independent hydraulic system 31 associated with the first housing motor 30 via branch conduit 38b. The first brake apparatus 130 is simultaneously operatively coupled to the independent hydraulic system 61 associated with the second hydraulic motor 60 and to the clutch actuation unit 115 via respectively branch conduit 68c, 68d and 68e.

The second brake apparatus 140 is responsively coupled separately to the independent hydraulic system associated with the third hydraulic motor 90 via branch conduit 98d, and to the independent hydraulic system 61 associated with the hydraulic motor 60 via branch conduit 68f.

The cooperative relationship of the arrangement just described will become evident in the description of the operation of the system hereinafter. This arrangement is constructed and interconnected in a manner that a hydraulic failure in the independent hydraulic systems 31, 91 associated with the first and third hydraulic motors 30, 90 result in a simultaneous actuation of the second brake 145 and the actuation of the clutch actuation unit 115 to thereby cause the double clutch 100 first member 103 to be coupled to the input shaft 101 of the double clutch 100, which results in the second hydraulic motor 60 driving the rudder 13 via the gear 106, gear arrangement 51, concentric shaft arrangement 52, sun gear arrangement 22 and planetary gear arrangement 24, gear 16, gear 17 and shaft 12 to the rudder 13.

System Operation

The following descriptions primarily relate to the operation of the hydromechanical system 10 during various hydraulic system failure modes.

Normal system operation has the rudder 13 operating off the hydraulic system 31 with a manual input through a mechanical linkage 35 from pilot pedals (not shown) and the yaw damping function operating off the hydraulic system 91 with an electrical input to the electro-hydraulic servo valve EHSV$_3$. These two signals are mechanically summed in the differential transmission 21.

During a hydraulic system failure in the hydraulic system 31, the following operation will occur. Pressure will be released on clutch actuation piston 119, shuttle piston 71, moving a shut-off valve piston 69 to close off hydraulic system 61 from the yaw damper brake 145 utilizing piston 143. Simultaneously, piston 122 will release piston 126 which acts as a blocking valve, allowing pressure supply to enter the valving system 62 of hydraulic motor 60. Pressure will also be supplied to piston 133 and piston 118 maintaining a released brake on the sun gear 22, while pressure from the hydraulic system 91, which is maintained on piston 117 will drive against piston 119 to cause a clutch engagement plate (not referenced) to engage the output 102 of hydraulic motor 60 with the output gear 106 which is connected as described earlier to the sun gear 22 of the differential transmission 21. Hydraulic system 61 is now connected to perform the rudder function replacing the hydraulic system 31 and hydraulic motor 30. The system that now operates has all of the features available had hydraulic system 31 not failed, i.e., mechanical input via pilot actuated linkage 35 to a manual servo valve 41 or electrical input through an electro-hydraulic servo valve 42. Feedback to the same mechanical linkage is accomplished by a feedback member Z connected to the sun gear 22 via screw 40, shaft 45, gears 50, 53, concentric shaft arrangement 52 and operates on either the hydraulic system 31 or the hydraulic system 61 at all times.

Now assuming the normal operation again, and a failure of the hydraulic system 91, the following operation sequence will occur: pressure being removed from the hydraulic system 91 will cause piston 117 to release its force on the clutch actuation lever 105 at the same time piston 123 will release its force allowing piston 126 of the failure detection mechanism 120 to open pressure into electro-hydraulic servo valve EHSV$_2$ and manual control valve MV$_2$. Pressure will also be released from piston 142, but will be supplied by piston 143 maintaining a released brake for the yaw damper. Pistons 112, 113 will be released, thereby freeing the mechanical linkage 114 grounding point, thereby eliminating its operation from the hydraulic motor 60, (motor 60 must now operate only with electrical input signals). Piston 119, which is supplied from the hydraulic system 31 will provide enough force to engage the clutch second output 104 which connects the output 102 of the motor 60 via gears 107, 108 concentric shaft 109 to gear 111, which then provides torque to the ring gear 23 of the differential transmission 21. The hydro-mechanical system is now fully operational again with motor 60 providing the yaw damping function and motor 30 providing its normal rudder function.

Another potential failure condition would be the simultaneous failure of hydraulic system 91 and hydraulic system 31, or as could happen, one system would fail and then the other. For purposes however of this operationaly description, it will be assumed that both systems fail simultaneously.

Failure of the hydraulic system 31 and hydraulic system 91 will result in a release of pistons 122, 123, 132, 117, 119, 71, 142, 112 and 113. Release of piston 71 will cause the piston 69 to block conduit branch 68f and prevent pressure from reaching piston 143, therefore the second brake 145 or yaw damping brake as it may be termed will come on and lock the ring gear 23 of the summing differential transmission 21 via concentric shaft 109 and gear 111. Release of pistons 112 and 113 will release the manual input via mechanical linkages 35 and 114 to the motor control device 62 of motor 60 eliminating all use of manual input. Release of pistons 122 and 123 will allow the movement of piston 126 opening the passage between conduit branches 68a and 68b, thereby porting pressure to EHSV$_2$, and the manual control valve MV$_2$ and also porting pressure to piston 133 and piston 118. Piston 133 will maintain a released brake on the rudder mode for the input to the sun gear 22 of the differential transmission 21, while piston 118 will provide sufficient force to engage the clutch between the motor 60, output 102 via shaft 101, first clutch output 103, gear 106, gear 51, concentric shaft 52 and sun gear 22 of the differential transmission 21.

At this point we have a single motor driving into the sun gear of the differential transmission 21 with the ring gear locked out. Control of this single motor is done electrically; this motor can now provide both the rudder function, and superimposed on the rudder function the yaw damping function since its control is electrically from an aircraft autopilot or computer not shown.

It may also be presummed that there is a potential failure of all three hydraulic systems simultaneously. Should this occur, the rudder brake 135 and the yaw damping brake 145 will both be released to a locking condition thereby causing the system to fail in a fixed position.

Failure Detection

Dual load path gearing is provided between the output gear of any single hydraulic motor and the differential running through a differential to the two output shafts 12 and 14. Failure of the hydraulic system on any of the three systems can be determined with a pressure indication which is normally found on the systems in the aircraft. The major failure we must detect is a failure to operate on any one of the systems. This is quite easy to determine; if one would turn off the hydraulic system 61 and operate the hydraulic system 31 for rudder and the hydraulic system 91 for yaw damp and the system functions properly, it would be known that both of those systems are working well. If one would then turn on the hydraulic system 61 and turn off the hydraulic system 31, it can be determined if the hydraulic system 61 has engaged the rudder function and is operating the rudder 13. Conversely, if the hydraulic system 31 were left on and the hydraulic system 91 turned off, it can be determined if the hydraulic system 61 is operating the yaw damper mode properly. With these simple checks one should be able to provide for built-in testing of the system that will require automatically determining any failures within the system in general including broken shafts or locked up motors. One can determine if the brakes are operating by removing pressure from both the hydraulic systems 61 and 91 and driving the hydraulic system 31, that will determine whether the yaw damper brake is functioning, and, conversely, if we remove pressure from the hydraulic system 61 and 31, it would determine if the rudder brake is functioning.

This system can provide much better troubleshooting than a conventional hydraulic yaw system, and, in addition, provides much better fail/operate capability since any one of the three motors in truth can operate both rudder and yaw damping when the electro-hydraulic mode is used. This type of functioning can greatly assist the pilot since he does have a computer to enable him to detect failures and then allow him to override to correct for these. The normal hydraulic servo cylinder system cannot operate full function off of the yaw damping mode since it is a limited authority device. This system however can be made to provide full rudder signals and yaw damp signals off of any of the three motors.

Although this invention has been illustrated and described in connection with the particular embodiment illustrated, it will be apparent to those skilled in the art that various changes may be made therein without departing from the spirit of the invention as set forth in the appended claims.

I claim:

1. A hydromechanical system for a power drive unit having an output shaft drivingly coupled to a load, said system including in combination;
    a differential means having first and second members drivingly coupled through a third member to said output shaft and said load,
    first, second and third hydraulic motors each operating from an associated controllable independent hydraulic system,
    said first and third hydraulic motors having outputs drivingly coupled respectively to said differential means first and second members,
    a clutch means having an input shaft drivingly coupled to be driven by an output of said second hydraulic motor, said clutch means having first and second outputs respectively drivingly coupled to said differential means first member and said second member,
    clutch actuation means controllingly coupled to said clutch means to cause said clutch actuation means to couple said input shaft to either said first or said second outputs,
    said clutch actuation means having a normally neutral operative state whereby neither said first or second outputs are coupled to said input shaft,
    hydraulic failure detection means controllingly coupled to the independent hydraulic system associated with said second hydraulic motor and to said clutch actuation means, and
    said hydraulic failure detection means responsive to a hydraulic system failure in said first and third hydraulic motor independent hydraulic systems to thereby cause said clutch actuation means to connect said second hydraulic motor output through one of said clutch means first and second outputs, dependent upon which one of said first and third hydraulic systems has failed whereby said load is always driven by at least two hydraulic motors via said differential means when one of said hydraulic systems of either said first or third hydraulic motors experiences a failure.

2. The hydromechanical system of claim 1 wherein said combination includes:
    a first and a second brake means controllably releaseably connectable respectively to said differential means first and second members,
    said first brake means responsively coupled to the independent hydraulic system associated with said first hydraulic motor,
    said first brake means simultaneously operatively coupled to the independent hydraulic system associated with said second hydraulic motor and to said clutch actuation means,
    said second brake means responsively coupled separately to the independent hydraulic system associated with said third hydraulic motor and to the independent hydraulic system associated with said second hydraulic motor, whereupon a hydraulic failure in hydraulic systems associated with said first and third motors results in the simultaneous actuation of said second brake means and the actuation of clutch actuation means to thereby cause said clutch means first member to be coupled to input shaft of said clutch means resulting in said second hydraulic motor driving said load via said differential means first and third members.

3. The hydromechanical system of claim 2 wherein said first, second and third motors are variable displacement motors.

4. The hydromechanical system of claim 3 wherein said differential means first member is a sun gear, said second member is a ring gear and said third member is a planetary gear arrangement cooperatively interposed between said sun gear and said ring gear.

5. The hydromechanical system of claim 4 wherein said first and said second brake means are of the hydraulic release mechanically applied type.

6. The hydromechanical system of claim 5 wherein each of said independent hydraulic systems each include respectively first hydraulic motor control means, second hydraulic motor control means and third hydraulic motor control means,
   each of said first, second and third hydraulic motor control means being independently electrically remotely controllable.

7. The hydromechanical system of claim 6 wherein said first and second hydraulic motor control means have coupled thereto mechanical means which are additionally remotely controllable and responsively dependent upon the operating condition of the independent hydraulic system associated with said third variable displacement hydraulic motor.

8. The hydromechanical system of claim 7 wherein a feedback means is responsively coupled to said differential means first member and said mechanical means to thereby provide a mechanical feedback of said first variable displacement motor output.

9. The hydromechanical system of claim 8 wherein said load is an aircraft's flight control surface.

10. The hydromechanical system of claim 9 wherein said flight control surface is a rudder.

11. The hydromechanical system of claim 10 wherein said first variable displacement motor when actuated provides said rubber with power to cause gross motion of said rudder and said third variable displacement motor when actuated provides said rudder with power to cause yaw damping motion of said rudder.

12. The hydromechanical system of claim 11 wherein said second variable displacement motor provides power to said rudder to thereby cause both gross motion and yaw damping motion of said rudder when said hydraulic system failure arises in respect of said hydraulic systems associated with said first and third variable displacement motors.

13. The hydromechanical system of claim 1 wherein said first, second and third motors are variable displacement motors.

14. The hydromechanical system of claim 13 wherein said differential means first member is a sun gear, said second member is a ring gear and said third member is a planetary gear arrangement cooperatively interposed between said sun gear and said ring gear.

15. The hydromechanical system of claim 14 wherein each of said independent hydraulic systems each include respectively first hydraulic motor control means, second hydraulic motor control means and third hydraulic motor control means,
   each of said first, second and third hydraulic motor control means being independently electrically remotely controllable.

16. The hydromechanical system of claim 15 wherein said first and second hydraulic motor control means have coupled thereto mechanical means which are additionally remotely controllable and responsively dependent upon the operating condition of the independent hydraulic system associated with said third variable displacement hydraulic motor.

17. The hydromechanical system of claim 16 wherein a feedback means is responsively coupled to said differential means first member and said mechanical means to thereby provide a mechanical feedback of said first variable displacement motor output.

18. The hydromechanical system of claim 17 wherein said load is an aircraft's flight control surface.

19. The hydromechanical system of claim 18 wherein said flight control surface is a rudder.

20. The hydromechanical system of claim 19 wherein said first variable displacement motor when actuated provides said rudder with power to cause gross motion of said rudder and said third variable displacement motor when actuated provides said rudder with power to cause yaw damping motion of said rudder.

21. The hydromechanical system of claim 20 wherein said second variable displacement motor provides power to said rudder to thereby cause both gross motion and yaw damping motion of said rudder when said hydraulic system failure arises in respect of said hydraulic systems associated with said first and third variable displacement motors.

22. A hydromechanical system for a power driven unit having an output shaft drivingly coupled to a load, said system including in combination:
   a mechanical transmission drivingly connected to said output shaft and said load,
   said mechanical transmission being of the differential type having first and second members drivingly coupled through a third member to said power drive unit output shaft,
   first, second and third independently hydraulically actuated motors,
   said first and third hydraulically actuated motors drivingly coupled respectively to said mechanical transmission,
   a clutch means having an input shaft drivingly coupled to be driven by said second hydraulically actuated motor, said clutch means having first and second outputs respectively drivingly coupled to said mechanical transmission,
   clutch actuation means controllingly coupled to said clutch means to cause said clutch actuation means to couple said input shaft to either said first or said second outputs,
   said clutch actuation means having a normally neutral operative state whereby neither said first or second outputs are coupled to said input shaft,
   hydraulic failure detection means controllingly coupled to said second hydraulically actuated motor and to said clutch actuation means, and
   said hydraulic failure detection means responsive to a hydraulic system failure in said first and third hydraulically actuated motors to thereby cause said clutch actuation means to connect said second hydraulically actuated motor output through one of said clutch means first and second outputs, dependent upon which one of said first and third hydraulically actuated motors has failed whereby said load is always driven by at least two hydraulic motors via said mechanical transmission when one of said first or third hydraulically actuated motors experiences a failure.

* * * * *